(12) United States Patent
Benesch et al.

(10) Patent No.: US 10,536,096 B2
(45) Date of Patent: Jan. 14, 2020

(54) CONTROL OF PHASE CURRENTS OF AN INVERTER

(71) Applicant: Siemens Aktiengesellschaft, München (DE)

(72) Inventors: Norbert Benesch, Heroldsberg (DE); Harald Wiessmann, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/333,127

(22) PCT Filed: Jul. 18, 2017

(86) PCT No.: PCT/EP2017/068070
§ 371 (c)(1),
(2) Date: Mar. 13, 2019

(87) PCT Pub. No.: WO2018/050321
PCT Pub. Date: Mar. 22, 2018

(65) Prior Publication Data
US 2019/0238065 A1    Aug. 1, 2019

(30) Foreign Application Priority Data
Sep. 15, 2016 (EP) ..................................... 16189018

(51) Int. Cl.
*H02M 1/08* (2006.01)
*H02M 7/5387* (2007.01)
*H02M 7/493* (2007.01)
*H02M 1/00* (2006.01)
(Continued)

(52) U.S. Cl.
CPC .......... *H02M 7/53871* (2013.01); *H02M 1/08* (2013.01); *H02M 7/493* (2013.01); *H02M 2001/0054* (2013.01)

(58) Field of Classification Search
CPC ...... H02M 7/493; H02M 3/1588; H02M 1/08; H02M 7/53871; H02P 25/22
(Continued)

(56) References Cited

U.S. PATENT DOCUMENTS

| 4,641,075 A | 2/1987 | Asano et al. | |
| 8,487,568 B2 * | 7/2013 | Franke | H02M 7/493 318/400.3 |

(Continued)

FOREIGN PATENT DOCUMENTS

CN    105870969 A    8/2016

OTHER PUBLICATIONS

Zhang Yu et al: "Sliding mode based zero-sequence current mitigation of parallel-connected power converters", Electric Machines and Drives Conference, 2909. IEMDC '09. IEEE International, IEEE, Piscataway, NJ, USA, pp. 1658-1663, XP031475994, ISBN: 978-1-4244-4251-5, Abstract p. 1658, pp. 1658-1660, Abbildungen 2, 3, 5, p. 1659, Spalte 1, Zeile 3-5; 2009.
(Continued)

*Primary Examiner* — Rajnikant B Patel
(74) *Attorney, Agent, or Firm* — Henry M. Feiereisen LLC

(57) ABSTRACT

The invention relates to a method for controlling phase currents (iU_WR1, iv_WR1, iw_WR1) of a three-phase inverter (WR1), the phase currents (iU_WR1, iv_WR1, iw_WR1) of the inverter (WR1) being controlled by way of a direct hysteresis current control and a selected phase of the inverter (WR1) being additionally switched depending on a zero system current (i0_WR1) of the inverter (WR1).

13 Claims, 5 Drawing Sheets

(58) Field of Classification Search
USPC ...... 363/17, 39–41, 56.08, 65, 71, 131, 132;
323/282–289; 318/432, 496, 801
See application file for complete search history.

(56) References Cited

U.S. PATENT DOCUMENTS

| | | | | |
|---|---|---|---|---|
| 8,988,056 | B2* | 3/2015 | Smith, Jr. | H02M 3/1588 |
| | | | | 323/282 |
| 9,450,479 | B2* | 9/2016 | Basic | H02M 1/12 |
| 9,853,570 | B2* | 12/2017 | Maly | H02M 1/088 |
| 9,985,566 | B2* | 5/2018 | Jiang | B66B 1/308 |

OTHER PUBLICATIONS

Mohseni Mansour et al: "A New Vector-Based Hysteresis Current Control Scheme for Three-Phase PWM Voltage-Source Inverters", IEEE Transactions on Power Electronics, Institute of Electrical and Electronics Engineers, USA, Bd. 25, Nr. 9. pp. 2299-2309, XP011306593, ISSN: 0885-8993, Gleichung (1), pp. 2300-2302, Abbildung 4; 2010.

Schäfer Markus et al: "Multilevel direct current control for grid-connected Inverters", 2015 17th European Conference on Power Electronics and Applications (EPE'15 Ecce-Europe), Jointly Owned by EPE Association and IEEE PELS, pp. 1-7, XP032500130, DOI: 10.1109/EP.2015.7309127, gefunden am Oct. 27, 2015, p. 2; 2015.

PCT International Preliminary Examination Report and Written Opinion of International Examination Authority dated Nov. 23, 2018 corresponding to PCT International Application No. PCT/EP2017/068070 filed Jul. 18, 2017.

* cited by examiner

CONTROL OF PHASE CURRENTS OF AN INVERTER

CROSS-REFERENCES TO RELATED APPLICATIONS

This application is the U.S. National Stage of International Application No. PCT/EP2017/068070, filed Jul. 18, 2017, which designated the United States and has been published as International Publication No. WO 2018/050321 and which claims the priority of European Patent Application, Serial No. 16189018.1, filed Sep. 15, 2016, pursuant to 35 U.S.C. 119(a)-(d).

BACKGROUND OF THE INVENTION

The invention relates to the control of phase currents of a three-phase inverter.

The inverter generates pulsed phase voltages which can assume a plurality of voltage values. For this purpose the inverter has, for each phase, a switching unit having a plurality of switching states by means of which the phase voltage of the phase is set to one of the voltage values in each case.

A problem arising for phase current control of a three-phase inverter is the possible occurrence of a zero sequence current. A zero sequence current of an inverter is the non-vanishing sum of the three phase currents. Zero sequence currents can in particular produce circulating currents which combine via electrical conductors, e.g. even ground conductors, connected to the inverter and can cause undesirable system oscillations. Particularly in parallel-connected inverters, circulating currents can occur which flow between the individual inverters and reduce the total output power of the parallel-connected inverters. Paralleling of a plurality of inverters is often used to interconnect the individual inverters to form an inverter having a higher total output power and availability.

The object of the invention is to specify improved control of phase currents of a three-phase inverter particularly in respect of reducing zero sequence currents.

SUMMARY OF THE INVENTION

This object is achieved according to the invention by a method for controlling phase currents of a three-phase inverter, wherein the phase currents of the inverter are controlled by direct hysteresis current control, and a selected phase of the inverter is additionally switched as a function of a zero sequence current of the inverter.

Advantageous embodiments of the invention are set forth in the sub-claims.

In an inventive method for controlling phase currents of a three-phase inverter, the phase currents of the inverter are controlled using direct hysteresis current control and a selected phase of the inverter is additionally switched as a function of a zero sequence current of the inverter.

Hysteresis control is to be understood as meaning a form of control in which the controlled variable is kept within a tolerance range around a setpoint. This tolerance range will be termed the hysteresis window in the following. Direct current control is to be understood as meaning a form of current control where the pulse pattern is derived directly from a current error. With indirect current control, on the other hand, a voltage setpoint is first established and the pulse pattern is determined on the basis of this voltage value.

The invention combines direct hysteresis current control of the phase currents of an inverter with switching of a phase of the inverter, here referred to as the selected phase, as a function of a zero sequence current of the inverter.

Compared with indirect current control based on pulse width modulation, direct current control advantageously provides higher dynamics and robustness, e.g. in respect of parameter changes in the controlled system, as the PWM pulse pattern used within the pulse periods must be calculated in advance in the case of PWM-based indirect current control.

Switching of a selected phase of the inverter as a function of a zero sequence current of the inverter additionally makes it possible to reduce the inverter's zero sequence current which can produce a circulating current and the undesirable system oscillations caused by said circulating current.

An embodiment of the invention provides that a first hysteresis window is predefined for the zero sequence current and the selected phase is switched when the zero sequence current leaves the first hysteresis window. This embodiment of the invention enables the zero sequence current of the inverter to be limited to a hysteresis window for the inverter.

According to another embodiment of the invention, the selected phase is not switched when the zero sequence current is within the first hysteresis window. This embodiment of the invention provides a modification of a so-called flat-top characteristic. In conventional flat-top modulation, a phase is not switched in every fundamental period of the control in order to reduce the number of switching operations and therefore the switching losses. This characteristic can also be achieved using direct current control by suitably triggering the switching units of the inverter. The inventive modification of the flat-top method using direct current control provides that the selected phase is the phase that is intended as a non-switching phase in the flat-top method. This phase is therefore only switched as a function of the zero sequence current of the inverter.

Another embodiment of the invention provides that the selected phase is changed as a function of a phase relationship of the required output voltages. For example, the phase with the inverter's largest phase voltage in absolute value terms is used as the selected phase in each case. These embodiments of the invention therefore link the selection of the phase switched as a function of the zero sequence current to the phase relationship of the phase voltages of the inverter. Especially in the case of an approximately identical phase relationship of phase currents and voltages, this enables switching losses to be further reduced by minimizing the switching frequency of the phase having the instantaneously highest current intensity.

Another embodiment of the invention provides that SDHC current control is used as the hysteresis current control method. So-called SDHC (Switched Diamond Hysteresis Control) is to be understood as referring to a current control technique as disclosed in H. Wießmann, Hochdynamisches direktes Stromregelverfahren für Pulswechselrichter im Vergleich zu PWM-Verfahren (High-dynamic direct current control method for pulse-controlled inverters compared to PWM methods), ISBN 978-3843904759, published by Dr. Hut 2012. For SDHC, four adjacent space vectors whose tips form a diamond are used for current control of an inverter at each point in time. The SDHC method advantageously combines the high dynamics and robustness of direct hysteresis current control with the excellent steadystate behavior of a space vector modulated converter. In addition, the SDHC method possesses an inherent flat-top characteristic.

The method according to the invention is designed in particular for controlling phase currents of a plurality of three-phase inverters connected in parallel, wherein the phase currents of each inverter are controlled using the method according to the invention. This provides an advantageous means of reducing, in particular, circulating currents which can occur between the individual parallel-connected inverters. Such circulating currents reduce the total output power of the parallel-connected inverters, as they flow between the parallel-connected inverters and do not therefore contribute to the currents that are fed into a power grid by the parallel-connected inverters.

An embodiment of phase current control of parallel-connected inverters provides that, for each inverter, an actual current space vector for actual values of the phase currents of the inverter is kept around a setpoint current space vector within a second hysteresis window. The actual current space vector of a first inverter is formed from all three phase currents of the first inverter, and the actual current space vector of every other inverter is formed from just two phase currents of the inverter, assuming that all three phase currents of the inverter add up to zero, wherein the selection of the two phase currents from which the actual current space vector is formed is varied.

The abovementioned formation of the actual current space vector for controlling the phase currents also serves to reduce circulating currents flowing through the parallel-connected inverters. For this purpose the actual current space vector of each further inverter other than the first inverter is formed at each point in time from just two phase currents, it being assumed that all three phase currents of the inverter add up to zero, even if this generally (namely for each non-vanishing zero sequence current) is not actually the case. This means that the two phase currents from which the actual current space vector of one of the other inverters is formed are adjusted to their setpoint values even if a zero sequence current of that inverter is non-vanishing. Although in the case of a non-vanishing zero sequence current the third phase current is not adjusted to its setpoint value, varying i.e. consecutively changing the selection of the phase currents from which the actual current space vector of the other inverter is formed in each case ensures that, after a brief control settling phase, all three phase currents correspond at least approximately (within the second hysteresis window) to their setpoint values. As a result, a zero sequence current is eliminated in each of the other inverters by in each case changing the phase whose phase current is not used to form the actual current space vector. The inventive control of a selected phase of the inverter as a function of the zero sequence current means that, in addition, the zero sequence current of another inverter is also eliminated between the changes of the phase whose phase current is not used to form the actual current space vector. In addition, a zero sequence current of the first inverter is also eliminated.

Another embodiment of phase current control of parallel-connected inverters provides that the phase currents of each inverter are controlled independently of the actual values of the phase currents of the other inverters. According to this embodiment of the invention, no communication between the individual inverters is used. This advantageously increases the modularity of the overall system comprising a plurality of inverters, so that inverters can be interconnected in a simple manner without having to implement communication between the inverters. In addition, the cost of implementing the overall system is reduced and the robustness of the overall system is increased.

Another embodiment of phase current control of parallel-connected inverters provides that, for each of the other inverters, the phase whose phase current is not used to form the actual current space vector is used as the selected phase in each case. The selected phase in each case is preferably switched according to the abovementioned modified flat-top response only as a function of the zero sequence current. This means that, in the case of virtually zero-sequence-current-free phase currents, the selected phase is not switched, resulting in normal flat-top modulation which advantageously reduces the number of switching operations and therefore the switching losses produced by the switching operations. If no continuous excitation of a zero sequence current occurs, only a small number of switching operations take place in the selected phases, thus resulting in only a slight deviation from normal flat-top modulation.

Another embodiment of phase current control of parallel-connected inverters provides that the same setpoint current space vector is used at each point in time for all the inverters. As a result, the inverters are uniformly loaded and current control is simplified even further.

Another embodiment of phase current control of parallel-connected inverters provides that each actual current space vector and each setpoint current space vector is formed in a stator-fixed coordinate system. The actual current space vector of the first inverter (WR1) is formed, for example according to $$\begin{pmatrix} i_{\alpha_{WR_1}} \\ i_{\beta_{WR_1}} \\ i_{o_{WR_1}} \end{pmatrix} = \frac{1}{3} \begin{pmatrix} 2 & -1 & -1 \\ 0 & \sqrt{3} & -\sqrt{3} \\ 1 & 1 & 1 \end{pmatrix} * \begin{pmatrix} i_{U_{WR_1}} \\ i_{V_{WR_1}} \\ i_{W_{WR_1}} \end{pmatrix}$$

where $i_{U\_WR1}$, $i_{V\_WR1}$, $i_{W\_WR1}$ denote the phase currents (or more precisely the actual values of the phase currents) of the first inverter. The actual current space vector of every other inverter is formed as a function of the phase currents used to form it, e.g. according to $$\begin{pmatrix} i_{\alpha_{WR_2}} \\ i_{\beta_{WR_2}} \\ i_{o_{WR_2}} \end{pmatrix}^* = \frac{1}{3} \begin{pmatrix} 3 & 0 & 0 \\ \sqrt{3} & 2\sqrt{3} & 0 \\ 0 & 0 & 0 \end{pmatrix} * \begin{pmatrix} i_{U_{WR_2}} \\ i_{V_{WR_2}} \\ i_{W_{WR_2}} \end{pmatrix}$$

or according to $$\begin{pmatrix} i_{\alpha_{WR_2}} \\ i_{\beta_{WR_2}} \\ i_{o_{WR_2}} \end{pmatrix}^{**} = \frac{1}{3} \begin{pmatrix} 0 & -3 & -3 \\ 0 & \sqrt{3} & -\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}$$

or according to $$\begin{pmatrix} i_{\alpha_{WR_2}} \\ i_{\beta_{WR_2}} \\ i_{o_{WR_2}} \end{pmatrix}^{***} = \frac{1}{3} \begin{pmatrix} 3 & 0 & 0 \\ -\sqrt{3} & 0 & -2\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}$$

where $i_{U\_WR2}$, $i_{V\_WR2}$, $i_{W\_WR2}$ denote the phase currents (or more precisely actual values of the phase currents) of another inverter. These embodiments of the invention implement the abovementioned advantageous formation of the actual current space vectors of the inverters specifically by means of Clarke transformations of the actual values of the phase currents. For the other inverters, preferably only two phase currents are used in each case for the transformation in stator-fixed coordinates.

An inventive control device for controlling phase currents of a three-phase inverter comprises a current measuring device for acquiring the actual values of the phase currents of the inverter, and a hysteresis current control device comprising a first hysteresis controller and a second hysteresis controller. The first hysteresis controller generates standard switching signals for direct hysteresis current control of the phase currents. A second hysteresis controller generates an additional switching signal for a selected phase of the inverter as a function of a zero sequence current of the inverter. The advantages of such a control device arise from the abovementioned advantages of the method according to the invention.

The above described characteristics, features and advantages of this invention and the manner in which they are achieved will become clearer and more readily understandable in conjunction with the following description of exemplary embodiments which will be explained with reference to the accompanying drawings in which:

BRIEF DESCRIPTION OF THE DRAWING

In the figures, mutually corresponding parts are denoted by the same reference characters.

DETAILED DESCRIPTION OF PREFERRED EMBODIMENTS

Figure 1:
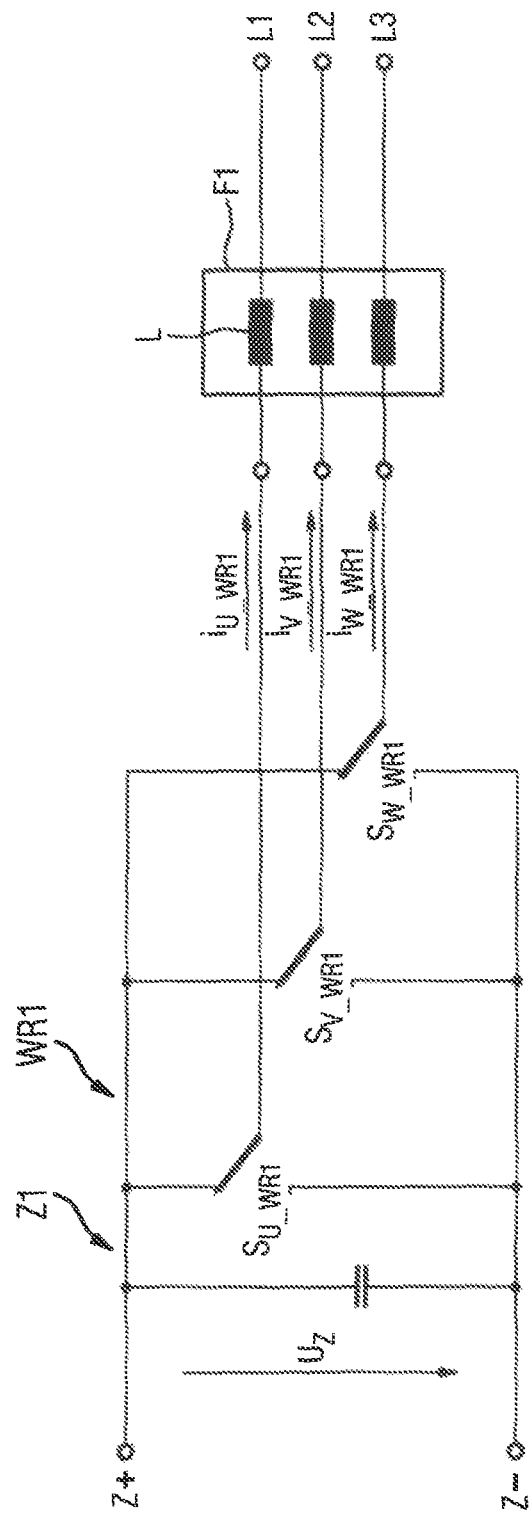
FIG. 1 shows an equivalent circuit diagram of an inverter.

FIG. 1 shows an equivalent circuit diagram of a three-phase inverter WR1.

The inverter WR1 has, on the input side, a DC link Z1 having a positive DC link potential Z+, a negative DC link potential Z− and a DC link voltage $U_Z$ which is the difference between the DC link potentials Z+, Z−.

The inverter WR1 also comprises, for each of its phases, a switch $S_{U\_WR1}$, $S_{V\_WR1}$, $S_{W\_WR1}$ having a first switching state which applies a phase potential of the phase to the positive DC link potential Z+, and a second switching state which applies the phase potential of the phase to the negative DC link potential Z−. Changing of the switching states of the switch $S_{U\_WR1}$, $S_{V\_WR1}$, $S_{V\_WR1}$ of a phase is referred to here as switching of the phase.

On the output side, the inverter WR1 is connected to a power grid N via a filter F1. The filter F1 has at least one inductor L for each phase of the inverter WR1. Each phase is connected to a grid-side terminal L1, L2, L3. A phase current $i_{U\_WR1}$, $i_{V\_WR1}$, $i_{W\_WR1}$ of the phase flows between the switch $S_{U\_WR1}$, $S_{V\_WR1}$, $S_{W\_WR1}$ and the terminal L1, L2, L3 of a phase.

Figure 2:
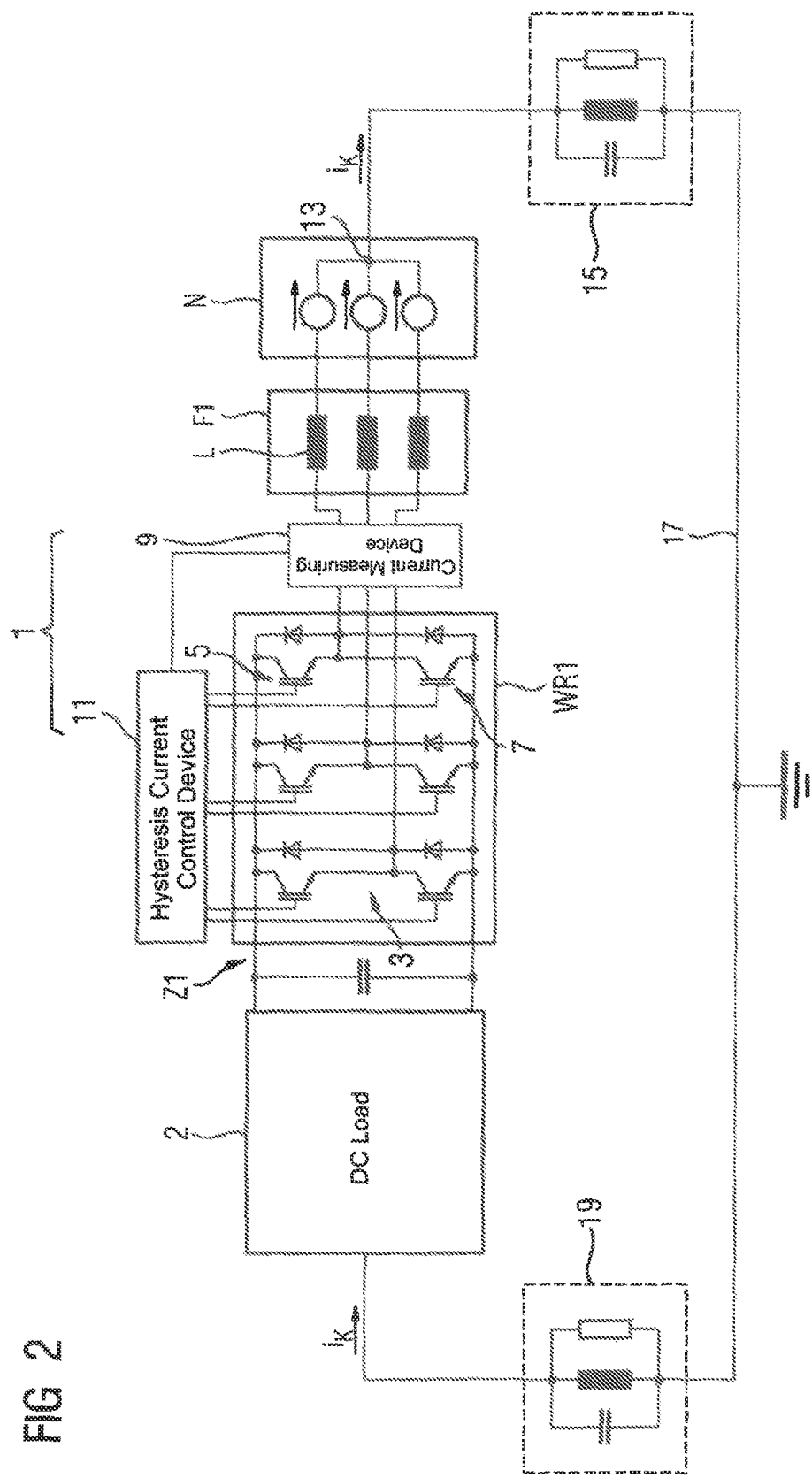
FIG. 2 shows a circuit diagram of an exemplary embodiment of an inverter and of a control device for controlling phase currents of the inverter,
FIG. 3 schematically illustrates the design of a hysteresis current control device.

FIG. 2 shows a circuit diagram of a specific exemplary embodiment of a three-phase inverter WR1 and schematically illustrates a control device 1 for controlling the phase currents $i_{U\_WR1}$, $i_{V\_WR1}$, $i_{W\_WR1}$ of the inverter WR1 and a DC load 2 connected to the DC links Z1, Z2 of the inverters WR1, WR2 on the input side.

The switches $S_{U\_WR1}$, $S_{V\_WR1}$, $S_{W\_WR1}$ are each implemented as a switching unit having a half-bridge 3 comprising a first switching element 5 and a second switching element 7. The switching elements 5, 7 are in each case implemented, for example, as a bipolar transistor with insulated gate electrode (IGBT=Insulated-Gate Bipolar Transistor) and an antiparallel connected diode. The first switching state of each switch $S_{U\_WR1}$, $S_{V\_WR1}$, $S_{W\_WR1}$ is produced by closing of the first switching element 5 and opening of the second switching element 7, the second switching state is produced by opening of the first switching element 5 and closing of the second switching element 7.

The control device 1 comprises a current measuring device 9 for acquiring the actual values of the phase currents $i_{U\_WR1}$, $i_{V\_WR1}$, $i_{W\_WR1}$ of the inverter WR1 and a hysteresis current control device 11 which is used to generate switching signals $Y_{U\_WR1}$, $Y_{V\_WR1}$, $Y_{W\_WR1}$ for the phases of the inverter WR1, WR2 from the acquired actual values of the phase currents $i_{U\_WR1}$, $i_{V\_WR1}$, $i_{W\_WR1}$ in the manner described in greater detail below, said switching signals being used to trigger the switches $S_{U\_WR1}$, $S_{V\_WR1}$, $S_{W\_WR1}$, i.e. switching elements 5, 7 in the exemplary embodiment shown in FIG. 2.

FIG. 2 shows by way of example a situation in which a zero sequence current $i_{0\_WR1}$ of the inverter WR1 flows as a circulating current $i_K$ via a star point 13 of the grid N, a first coupling 15, a ground conductor 17 and a second coupling 19 to a DC load 2 connected to the inverter WR1. The couplings 15, 19 are only shown schematically and can be, for example, parasitic elements and/or electrical connections.

The phase currents $i_{U\_WR1}$, $i_{V\_WR1}$, $i_{W\_WR1}$ of the inverter WR1 are controlled by the hysteresis current control device 11 using direct hysteresis current control which involves reducing the zero sequence current $i_{0\_WR1}$ of the inverter WR1 This control is described with reference to FIGS. 3 and 4.

Figure 3:
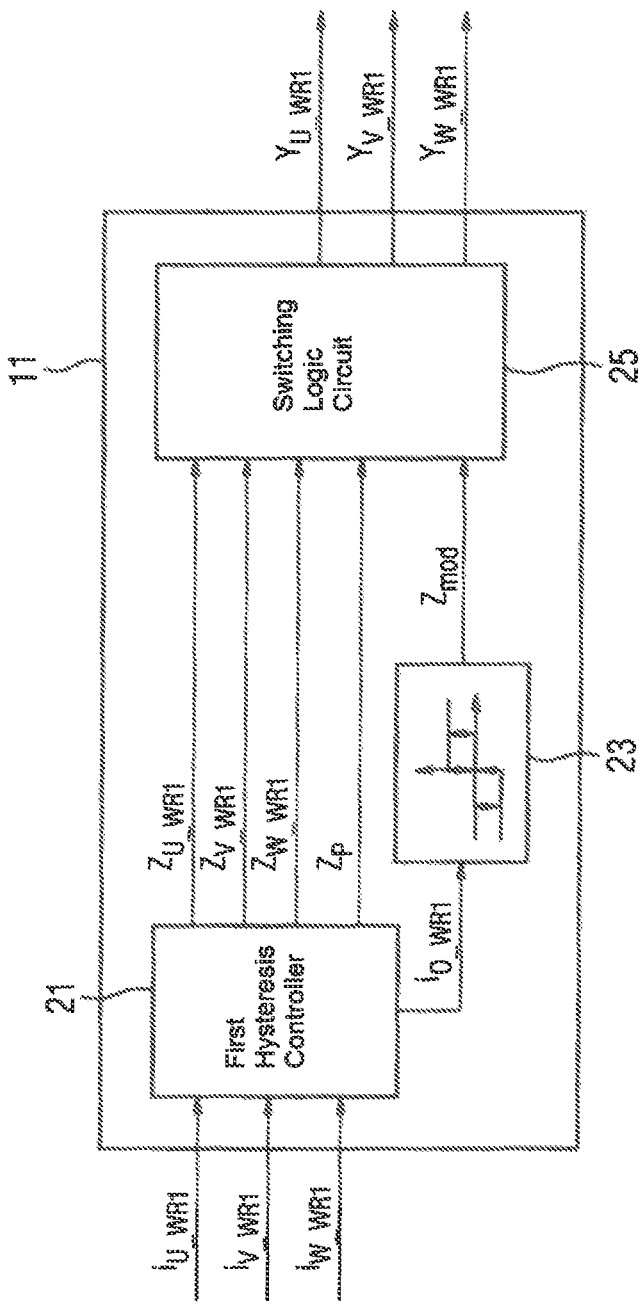

FIG. 3 schematically illustrates the design and functionality of the hysteresis current control device 11. A first hysteresis controller 21 uses conventional hysteresis current control, preferably SDRC current control, to generate standard switching signals $Z_{U\_WR1}$, $Z_{V\_WR1}$, $Z_{W\_WR1}$ for the switches $S_{U\_WR1}$, $S_{V\_WR1}$, $S_{W\_WR1}$ of the inverter WR1 from the actual values of the phase currents $i_{U\_WR1}$, $i_{V\_WR1}$, $i_{W\_WR1}$ obtained by the current measuring device 9. The standard switching signals $Z_{U\_WR1}$, $Z_{V\_WR1}$, $Z_{W\_WR1}$ are fed to a switching logic circuit 25. Each standard switching signal $Z_{U\_WR1}$, $Z_{V\_WR1}$, $Z_{W\_WR1}$ has the value range {−1,+1}, where the value +1 corresponds to the first switching state and the value −1 to the second switching state of the respective switch $S_{U\_WR1}$, $S_{V\_WR1}$, $S_{W\_WR1}$. The first hysteresis controller 21 additionally determines, in the manner described in greater detail below, just one phase of the inverter WR1 which is switched as a function of the zero sequence current $i_{0\_WR1}$ of the inverter WR1. The phase determined is communicated to the switching logic circuit 25 in the form of a phase selection signal $Z_P$ and will hereinafter be referred to as the selected phase.

A second hysteresis controller 23 checks if the zero sequence current $i_{0\_WR1}$ leaves a first hysteresis window and, depending on the result of this check, generates an additional switching signal $Z_{mod}$ which it feeds to the switching logic circuit 25. The actual value of said zero sequence current $i_{0\_WR1}$ is determined e.g. by the first hysteresis controller 21 and fed to the second hysteresis controller 23.

Figure 4:
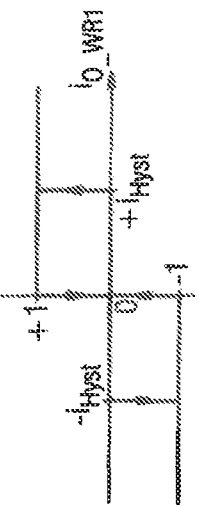
FIG. 4 shows a hysteresis graph for a zero sequence current of an inverter.

FIG. 4 illustrates the mode of operation of the second hysteresis controller 23 using a hysteresis graph for the zero sequence current $i_{0\_WR1}$. The first hysteresis window is an interval between a negative interval limit $-i_{Hyst}$ and a positive interval limit $+i_{Hyst}$. If the zero sequence current $i_{0\_WR1}$ is greater than the positive interval limit $+i_{Hyst}$, the additional switching signal $Z_{mod}$ is set to the value +1. If the zero sequence current $i_{0\_WR1}$ is smaller than the negative interval limit $-i_{Hyst}$, the additional switching signal $Z_{mod}$ is set to the value −1. If the zero sequence current $i_{0\_WR1}$ exceeds or falls below the value zero, the additional switching signal $Z_{mod}$ is set to the value 0 in each case. Between the value 0 and the positive interval limit $+i_{Hyst}$ and between the value 0 and the negative interval limit $-i_{Hyst}$, the switching signal $Z_{mod}$ remains unchanged in each case.

From the standard switching signals $Z_{U\_WR1}$, $Z_{V\_WR1}$, $Z_{W\_WR1}$, the phase selection signal $Z_P$ and the additional switching signal $Z_{mod}$, the switching logic circuit 25 generates the switching signals $Y_{U\_WR1}$, $Y_{V\_WR1}$, $Y_{W\_WR1}$ output by the hysteresis current control device 11. The switching signal $Y_{U\_WR1}$, $Y_{V\_WR1}$, $Y_{W\_WR1}$ for the selected phase is set to the value −1 if the additional switching signal $Z_{mod}$ assumes the value +1, to the value +1 if the additional switching signal $Z_{mod}$ assumes the value −1, and otherwise coincides with the standard switching signal $Z_{U\_WR1}$, $Z_{V\_WR1}$, $Z_{W\_WR1}$ for the selected phase. The switching signals $Y_{U\_WR1}$, $Y_{V\_WR1}$, $Y_{W\_WR1}$ for the other two phases coincide with the standard switching signal $Z_{U\_WR1}$, $Z_{V\_WR1}$, $Z_{W\_WR1}$ for the respective phase in each case. Therefore if, for example, the phase U is the selected phase, the following switching signals $Y_{U\_WR1}$, $Y_{V\_WR1}$, $Y_{W\_WR1}$ are output by the hysteresis current control device 11:

$$Y_{U_{WR_1}} = \begin{cases} -1 & \text{if } Z_{mod} = 1 \\ +1 & \text{if } Z_{mod} = -1 \\ Z_{U_{WR_1}} & \text{if } Z_{mod} = 0 \end{cases}, Y_{V_{WR_2}} = Z_{V_{WR_1}}, Y_{W_{WR_1}} = Z_{W_{WR_1}}.$$

The selected phase is changed e.g. as a function of a phase relationship of the output voltages. For example, the phase having the instantaneously largest output voltage, in absolute value terms, of the inverter WR1 is used as the selected phase in each case. As a result, a stator-fixed coordinate system for space vectors of the phase currents $i_{U\_WR1}$, $i_{V\_WR1}$, $i_{W\_WR1}$ is subdivided into 60 degree sectors, wherein a different phase is the selected phase in adjacent sectors.

In addition, to generate the standard switching signals $Z_{U\_WR1}$, $Z_{V\_WR1}$, $Z_{W\_WR1}$, hysteresis current control having a flat-top characteristic is preferably used in which one phase of the inverter WR1 is not switched in each fundamental period of the control. It is preferably this particular phase that is used as the selected phase. As a result, the selected phase is only switched if the zero sequence current $i_{0\_WR1}$ leaves the first hysteresis window.

The elimination of the zero sequence current $i_{0\_WR1}$ enables circulating currents $i_K$ of the kind illustrated in FIG. 2, which can result in system oscillations, to be attenuated.

Figure 5:
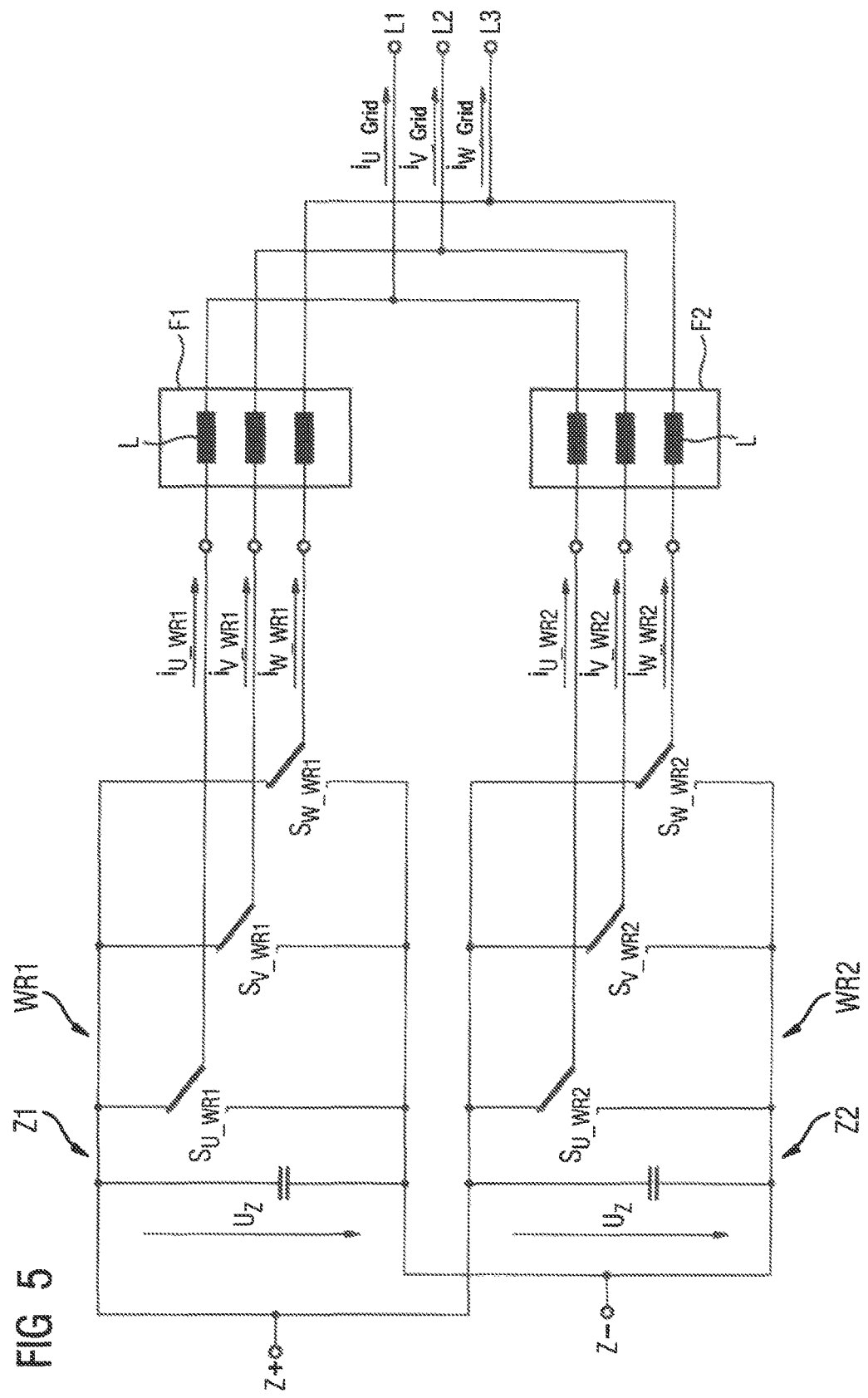
FIG. 5 shows an equivalent circuit diagram of two parallel-connected inverters.

FIG. 5 shows an equivalent circuit diagram of two parallel-connected three-phase inverters WR1, WR2.

Each inverter WR1, WR2 has, on the input side, a DC link Z1, Z2 having a positive DC link potential Z+, a negative DC link potential Z− and a DC link voltage $U_Z$ which is the difference between these DC link potentials Z+, Z−. The DC links Z1, Z2 of the inverters WR1, WR2 are connected in parallel so that they have the same positive DC link potential Z+, the same negative DC link potential Z− and the same DC link voltage $U_Z$.

In addition, for each of its phases, each inverter WR1, WR2 has a switch $S_{U\_WR1}$, $S_{V\_WR1}$, $S_{W\_WR1}$, $S_{U\_WR2}$, $S_{V\_WR2}$, $Z_{W\_WR2}$ having a first switching state which applies a phase potential of the phase to the positive DC link potential Z+, and a second switching state which applies the phase potential of the phase to the negative DC link potential Z−.

On the output side, each inverter WR1, WR2 is coupled to a power grid N via a separate filter F1, F2. The filters F1, F2 have at least one inductor L for each phase of the respective inverter WR1, WR2. The two mutually corresponding phases of the two inverters WR1, WR2 are interconnected on the output side and connected to a common grid-side terminal L1, L2, L3 so that the two phase currents $i_{U\_WR1}$, $i_{V\_WR1}$, $i_{W\_WR1}$, $i_{U\_WR2}$, $i_{V\_WR2}$, $Z_{W\_WR2}$ of these phases of the two inverters WR1, WR2 add up to a phase grid current $i_{U\_grid}$, $i_{V\_grid}$, $Z_{W\_grid}$ which is output via the terminal L1, L2, L3 connected to these phases.

Figure 6:
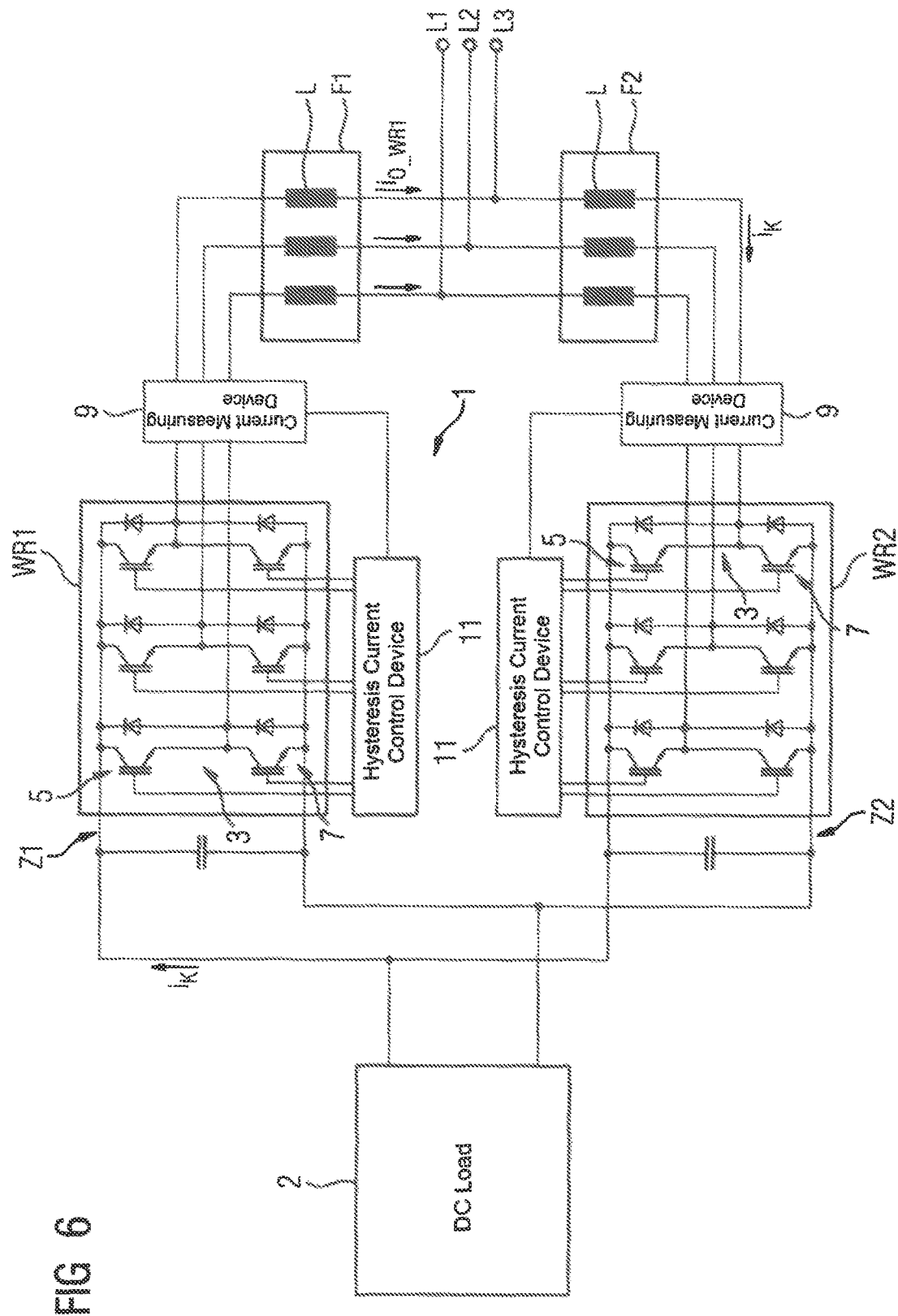
FIG. 6 shows a circuit diagram of an exemplary embodiment of two parallel-connected inverters and of a control device for controlling phase currents of the inverters.

FIG. 6 shows a circuit diagram of a specific exemplary embodiment of two parallel-connected three-phase inverters WR1, WR2 as shown in FIG. 5, and of a control device 1 for controlling the phase currents $i_{U\_WR1}$, $i_{V\_WR1}$, $i_{W\_WR1}$, $i_{U\_WR2}$, $i_{V\_WR2}$, $i_{W\_WR2}$ of the inverters WR1, WR2. A DC load 2 is connected to the DC links Z1, Z2 of the inverters WR1, WR2.

The switches $S_{U\_WR1}$, $S_{V\_WR1}$, $S_{W\_WR1}$, $S_{U\_WR2}$, $S_{V\_WR2}$, $S_{W\_WR2}$ are each implemented as a half-bridge 3 comprising a first switching element 5 and a second switching element 7. The switching elements 5, 7 are each implemented e.g. as an IGBT having a diode connected in antiparallel thereto. The first switching state of each switch $S_{U\_WR1}$, $S_{V\_WR1}$, $S_{W\_WR1}$, $S_{U\_WR2}$, $S_{V\_WR2}$, $Z_{W\_WR2}$ is produced by closing of the first switching element 5 and opening of the second switching element 7, the second switching state is produced by opening of the first switching element 5 and closing of the second switching element 7.

FIG. 6 shows by way of example a situation in which a zero sequence current $i_{0\_WR1}$ of a first inverter WR1 flows as a circulating current $i_K$ via the DC links Z1, Z2 between the inverters WR1, WR2. In the case shown in FIG. 6, the circulating current $i_K$ flows through the second inverter WR2 completely via the phase W and has three times the value of the zero sequence current $i_{0\_WR1}$ of the first inverter WR1.

The control device 1 comprises, for each inverter WR1, WR2, a current measuring device 9 for acquiring the actual values of the phase currents $i_{U\_WR1}$, $i_{V\_WR1}$, $i_{W\_WR1}$, $i_{U\_WR2}$, $i_{V\_WR2}$, $i_{W\_WR2}$ of the inverter WR1, WR2 and a hysteresis current control device 11 which generates switching signals $Y_{U\_WR1}$, $Y_{V\_WR1}$, $Y_{W\_WR1}$, $Y_{U\_WR2}$, $Y_{V\_WR2}$, $Y_{W\_WR2}$ for the phases of the inverters WR1, WR2 from the acquired actual values of the phase currents $i_{U\_WR1}$, $i_{V\_WR1}$, $i_{W\_WR1}$, $i_{U\_WR2}$, $i_{V\_WR2}$, $i_{W\_WR2}$ said signals being used to trigger the switches $S_{U\_WR1}$, $S_{V\_WR1}$, $S_{W\_WR1}$, $S_{U\_WR2}$, $S_{V\_WR2}$, $S_{W\_WR2}$ i.e. the switching elements 5, 7 shown in the exemplary embodiment in FIG. 6.

Each hysteresis current control device 11 is implemented as in FIG. 3. From the actual values of the phase currents $i_{U\_WR1}$, $i_{V\_WR1}$, $i_{W\_WR1}$, $i_{U\_WR2}$, $i_{V\_WR2}$, $i_{W\_WR1}$ of the respective inverter WR1, WR2, a first hysteresis controller 21 generates standard switching signals $Z_{U\_WR1}$, $Z_{V\_WR1}$, $Z_{W\_WR1}$, $Z_{U\_WR2}$, $Z_{V\_WR2}$, $Z_{W\_WR2}$ for the switches $S_{U\_WR1}$, $S_{V\_WR1}$, $S_{W\_WR1}$, $S_{U\_WR2}$, $S_{V\_WR2}$, $S_{W\_WR2}$ of the inverter WR1, WR2 in accordance with conventional direct hysteresis current control which is again preferably hysteresis current control having a flat-top characteristic and in particular SDHC current control. As described above with reference to FIG. 4, a second hysteresis controller 23 generates an additional switching signal $Z_{mod}$ for a selected phase current $i_{U\_WR1}$, $i_{V\_WR1}$, $i_{W\_WR1}$, $i_{U\_WR2}$, $i_{V\_WR2}$, $i_{W\_WR2}$ of the respective inverter WR1, WR2. From the standard switching signals $Z_{U\_WR1}$, $Z_{V\_WR1}$, $Z_{W\_WR1}$, $Z_{U\_WR2}$, $Z_{V\_WR2}$, $Z_{W\_WR2}$ and the additional switching signal $Z_{mod}$, a switching logic circuit 25 again generates the switching signals $Y_{U\_WR1}$, $Y_{V\_WR1}$, $Y_{W\_WR1}$, $Y_{U\_WR2}$, $Y_{V\_WR2}$, $Y_{W\_WR2}$ output by the hysteresis current control device 11 in the manner as described above with reference to FIGS. 3 and 4.

For each inverter WR1, WR2, the standard switching signals $Z_{U\_WR1}$, $Z_{V\_WR1}$, $Z_{W\_WR1}$, $Z_{U\_WR2}$, $Z_{V\_WR2}$, $Z_{W\_WR2}$ are formed by the first hysteresis controller 21 independently of the actual values of the phase currents $i_{U\_WR1}$, $i_{V\_WR1}$, $i_{W\_WR1}$, $i_{U\_WR2}$, $i_{V\_WR2}$, $i_{W\_WR2}$ of the respective other inverter WR1, WR2. An actual current space vector is formed from the actual values of the phase currents $i_{U\_WR1}$, $i_{V\_WR1}$, $i_{W\_WR1}$, $i_{U\_WR2}$, $i_{V\_WR2}$, $i_{W\_WR2}$ of each inverter WR1, WR2 in a stator-fixed coordinate system as will be described in greater detail below. The actual current space vector is kept within a second hysteresis window around a setpoint current space vector. For example, the same setpoint current space vector is used at each point in time for both inverters WR1, WR2.

The actual current space vector of the first inverter WR1 is formed from the current strengths of all three phase currents $i_{U\_WR1}$, $i_{V\_WR1}$, $i_{W\_WR1}$ of the first inverter WR1 according to the following equation [1] which is a conventional Clarke transformation, where $i_{0\_WR1}$ denotes the zero sequence current of the first inverter WR1:

$$\begin{pmatrix} i_{\alpha_{WR_1}} \\ i_{\beta_{WR_1}} \\ i_{o_{WR_1}} \end{pmatrix} = \frac{1}{3} \begin{pmatrix} 2 & -1 & -1 \\ 0 & \sqrt{3} & -\sqrt{3} \\ 1 & 1 & 1 \end{pmatrix} * \begin{pmatrix} i_{U_{WR_1}} \\ i_{V_{WR_1}} \\ i_{W_{WR_1}} \end{pmatrix}. \quad [1]$$

In contrast, the actual current space vector of the second inverter WR2 is preferably formed at each point in time from just two of the three phase currents $i_{U\_WR2}$, $i_{V\_WR2}$, $i_{W\_WR2}$ of the second inverter WR2 according to one of the following equations [2] to [4]:

$$\begin{pmatrix} i_{\alpha_{WR_2}} \\ i_{\beta_{WR_2}} \\ i_{o_{WR_2}} \end{pmatrix}^* = \frac{1}{3} \begin{pmatrix} 3 & 0 & 0 \\ \sqrt{3} & 2\sqrt{3} & 0 \\ 0 & 0 & 0 \end{pmatrix} * \begin{pmatrix} i_{U_{WR_2}} \\ i_{V_{WR_2}} \\ i_{W_{WR_2}} \end{pmatrix}, \quad [2]$$

$$\begin{pmatrix} i_{\alpha_{WR_2}} \\ i_{\beta_{WR_2}} \\ i_{o_{WR_2}} \end{pmatrix}^{**} = \frac{1}{3} \begin{pmatrix} 0 & -3 & -3 \\ 0 & \sqrt{3} & -\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}, \quad [3]$$

$$\begin{pmatrix} i_{\alpha_{WR_2}} \\ i_{\beta_{WR_2}} \\ i_{o_{WR_2}} \end{pmatrix}^{***} = \frac{1}{3} \begin{pmatrix} 3 & 0 & 0 \\ -\sqrt{3} & 0 & -2\sqrt{3} \\ 0 & 0 & 0 \end{pmatrix} * \begin{pmatrix} i_{U_{WR_2}} \\ i_{V_{WR_2}} \\ i_{W_{WR_2}} \end{pmatrix}, \quad [4]$$

where the equation selected from the equations [2] to [4] varies, i.e. is changed at consecutive points in time. Each of the equations [2] to [4] is a Clarke transformation in which, in each case, a phase current $i_{U\_WR2}$, $i_{V\_WR2}$, $i_{W\_WR2}$ has been calculated from the two other phase currents $i_{U\_WR2}$, $i_{V\_WR2}$, $i_{W\_WR2}$ of the second inverter WR2 on the assumption that the three phase currents $i_{U\_WR2}$, $i_{V\_WR2}$, $i_{W\_WR2}$ add up to zero, i.e. assuming that the zero sequence current of the second inverter WR2 disappears, although this is actually not generally the case.

For forming the actual current space vector of the second inverter WR2 according to one of the equations [2] to [4], in each case one of the phase currents $i_{U\_WR2}$, $i_{V\_WR2}$, $i_{W\_WR2}$ is not therefore used, i.e. the actual current space vector of the second inverter WR2 is formed only from the actual values of the other two phase currents $i_{U\_WR2}$, $i_{V\_WR2}$, $i_{W\_WR2}$ in each case. In equation [2] the phase current $i_{W\_WR2}$, in equation [3] the phase current $i_{U\_WR2}$ and in equation [4] the phase current $i_{V\_WR2}$ are not used to form the actual current space vector.

The phase whose phase current $i_{U\_WR2}$, $i_{V\_WR2}$, $i_{W\_WR2}$ is not used to form the actual current space vector of the second inverter WR2 is preferably used as the selected phase of the second inverter WR2. If the hysteresis current control that is used to form the standard switching signals $Z_{U\_WR1}$, $Z_{V\_WR1}$, $Z_{W\_WR1}$, $Z_{U\_WR2}$, $Z_{V\_WR2}$, $Z_{W\_WR2}$ provides a flat-top characteristic, with further preference the phase that is not to be switched according to the flattop characteristic is used as the phase whose phase current $i_{U\_WR2}$, $i_{V\_WR2}$, $i_{W\_WR2}$ is not used to form the actual current space vector of the second inverter WR2.

Due to the fact that the actual current space vector of the second inverter WR2 is formed according to one of the equations [2] to [4], the two phase currents $i_{U\_WR2}$, $i_{V\_WR2}$, $i_{W\_WR2}$ from which the actual current space vector is formed in each case are adjusted to their setpoint values even if a zero sequence current of the second inverter WR2 does not disappear. Although the respective third phase current $i_{U\_WR2}$, $i_{V\_WR2}$, $i_{W\_WR2}$ is not adjusted to its setpoint value in the case of a non-vanishing zero sequence current of the second inverter WR2, the permanent changing of the phase currents $i_{U\_WR2}$, $i_{V\_WR2}$, $i_{W\_WR2}$ from which the actual current space vector of the second inverter WR2 is formed in each case ensures that, after a brief control settling phase, all three phase currents $i_{U\_WR2}$, $i_{V\_WR2}$, $i_{W\_WR2}$ correspond at least approximately (within the second hysteresis window) to their setpoint values. Zero sequence currents of the second inverter WR2 and circulating currents $i_K$ through the second inverter WR2 therefore remain approximately constant between the changes of the phase whose phase current $i_{U\_WR2}$, $i_{V\_WR2}$, $i_{W\_WR2}$ is not used to form the actual current space vector of the second inverter WR2, and are eliminated by the changes of this phase. Due to the above-described additional switching of the selected phase of the second inverter WR2 as a function of its zero sequence current, the zero sequence current is also eliminated between changes of the phase whose phase current $i_{U\_WR2}$, $i_{V\_WR2}$, $i_{W\_WR2}$ is not used to form the actual current space vector of the second inverter WR2. In addition, due to the above-described additional switching of the selected phase of the first inverter WR1 as a function of its zero sequence current $i_{0\_WR1}$ this zero sequence current $i_{0\_WR1}$ is also eliminated.

The current control system described above with reference to FIGS. 5 and 6 for two inverters WR1, WR2 by way of example can be used in a similar manner for more than two parallel-connected three-phase inverters WR1, WR2 wherein one of the inverters WR1, WR2 is controlled like the first inverter WR1 of the above-described control system and every other inverter WR1, WR2 is controlled like the second inverter WR2 of the above-described control. In addition, instead of for two-level inverters whose switches $S_{U\_WR1}$, $S_{V\_WR1}$, $S_{W\_WR1}$, $S_{U\_WR2}$, $S_{V\_WR2}$, $S_{W\_WR2}$ only have two switching states, the above-described current control system can also be used in a similar manner for multi-level converters whose switches $S_{U\_WR1}$, $S_{V\_WR1}$, $S_{W\_WR1}$, $S_{U\_WR2}$, $S_{V\_WR2}$, $S_{W\_WR2}$ have more than two switching states.

Although the invention has been illustrated and described in detail by the preferred exemplary embodiments, the invention is not limited by the examples disclosed and other variations will be apparent to persons skilled in the art without departing from the scope of protection sought for the invention.

The invention claimed is:

1. A method for controlling phase currents of a three-phase inverter, comprising:
   controlling the phase currents of the inverter by directly controlling a hysteresis current by way of switching signals which each have a value range between −1 and +1,
   additionally switching a selected phase of the inverter as a function of a zero sequence current of the inverter,
   defining for the zero sequence current a first hysteresis window having a negative interval limit and a positive interval limit,
   setting an additional switching signal to a value +1 when the zero sequence current is greater than the positive interval limit, setting the additional switching signal to the value −1 when the zero sequence current is smaller than the negative interval limit, and setting the additional switching signal to the value 0 when the zero sequence current exceeds or falls below the value zero,
   setting the switching signal for the selected phase to the value −1 when the additional switching signal assumes the value +1, setting the switching signal for the selected phase to the value +1 when the additional switching signal assumes the value −1, and otherwise setting the switching signal for the selected phase to coincide with a standard switching signal for the selected phase, and
   setting the switching signals for the other two phases to coincide with the standard switching signal for the respective other phase.

2. The method of claim 1, further comprising changing the selected phase as a function of a phase relationship of output voltages of the inverter.

3. The method of claim 1, further comprising using as the selected phase a phase having a largest absolute value of an output voltage of the inverter.

4. The method of claim 1, further comprising using SDHC (Switched Diamond Hysteresis Control) current control as hysteresis current control.

5. A method for controlling phase currents of a plurality of parallel-connected three-phase inverters, wherein the phase currents of each inverter are controlled by
   controlling the phase currents of each inverter by directly controlling a hysteresis current by way of switching signals which each have a value range between −1 and +1,
   additionally switching a selected phase of each inverter as a function of a zero sequence current of each respective inverter,
   defining for the zero sequence current a first hysteresis window having a negative interval limit and a positive interval limit,
   setting an additional switching signal to a value +1 when the zero sequence current is greater than the positive interval limit, setting the additional switching signal to the value −1 when the zero sequence current is smaller than the negative interval limit, and setting the additional switching signal to the value 0 when the zero sequence current exceeds or falls below the value zero,
   setting the switching signal for the selected phase to the value −1 when the additional switching signal assumes the value +1, setting the switching signal for the selected phase to the value +1 when the additional switching signal assumes the value −1, and otherwise setting the switching signal for the selected phase to coincide with a standard switching signal for the selected phase, and
   setting the switching signals for the other two phases to coincide with the standard switching signal for the respective other phase.

6. The method of claim 5, further comprising:
   for each inverter, maintaining an actual current space vector for actual values of the phase currents of the inverter within a second hysteresis window around a setpoint current space vector,
   forming the actual current space vector of a first inverter from all three phase currents of the first inverter,
   forming the actual current space vector of every other inverter from just two phase currents of the other inverter by assuming that a sum of all three phase currents of every other inverter is zero, and
   varying the selection of the two phase currents from which the actual current space vector of every other inverter is formed.

7. The method of claim 5, further comprising controlling the phase currents of each inverter independently of the actual values of the phase currents of other inverters.

8. The method of claim 6, further comprising using as the selected phase for each of the other inverters the phase whose phase current is not used to form the actual current space vector.

9. The method of claim 6, further comprising using at each point in time the same setpoint current space vector for all inverters.

10. The method of claim 5, further comprising forming each actual current space vector and each setpoint current space vector in a stator-fixed coordinate system.

11. The method of claim 6, wherein the actual current space vector of the first inverter is formed according to $$\begin{pmatrix} i_{\alpha_{WR_1}} \\ i_{\beta_{WR_1}} \\ i_{0_{WR_1}} \end{pmatrix} = \frac{1}{3} \begin{pmatrix} 2 & -1 & -1 \\ 0 & \sqrt{3} & -\sqrt{3} \\ 1 & 1 & 1 \end{pmatrix} * \begin{pmatrix} i_{U_{WR_1}} \\ i_{V_{WR_1}} \\ i_{W_{WR_1}} \end{pmatrix},$$

wherein $i_{U\_WR1}$, $i_{V\_WR1}$, $i_{W\_WR1}$ denote the actual phase currents of the first inverter and $\{i_{\alpha WR1}, i_{\beta WR1}, i_{0 WR1}\}$ are coordinates of the current space vector of the first inverter.

12. The method of claim 10, wherein the actual current space vector of every other inverter is formed according to one of the following relationships:

$$\begin{pmatrix} i_{\alpha WR_2} \\ i_{\beta WR_2} \\ i_{o WR_2} \end{pmatrix}^* = \frac{1}{3}\begin{pmatrix} 3 & 0 & 0 \\ \sqrt{3} & 2\sqrt{3} & 0 \\ 0 & 0 & 0 \end{pmatrix} * \begin{pmatrix} i_{U WR_2} \\ i_{V WR_2} \\ i_{W WR_2} \end{pmatrix},$$

or $$\begin{pmatrix} i_{\alpha WR_2} \\ i_{\beta WR_2} \\ i_{o WR_2} \end{pmatrix}^{**} = \frac{1}{3}\begin{pmatrix} 0 & -3 & -3 \\ 0 & \sqrt{3} & -\sqrt{3} \\ 0 & 0 & 0 \end{pmatrix} * \begin{pmatrix} i_{U WR_2} \\ i_{V WR_2} \\ i_{W WR_2} \end{pmatrix},$$

or $$\begin{pmatrix} i_{\alpha WR_2} \\ i_{\beta WR_2} \\ i_{o WR_2} \end{pmatrix}^{***} = \frac{1}{3}\begin{pmatrix} 3 & 0 & 0 \\ -\sqrt{3} & 0 & -2\sqrt{3} \\ 0 & 0 & 0 \end{pmatrix} * \begin{pmatrix} i_{U WR_2} \\ i_{V WR_2} \\ i_{W WR_2} \end{pmatrix},$$

wherein $i_{U\_WR2}$, $i_{V\_WR2}$, $i_{W\_WR2}$ denote the actual phase currents of another inverter and $\{i_{\alpha WR2}, i_{\beta WR2}, i_{0 WR2}\}$ are coordinates of the current space vector of the other inverter.

13. A control device for controlling phase currents of a three-phase inverter using direct hysteresis current control by means of switching signals which each have a value range between −1 and +1, the control device comprising:

a current measuring device for acquiring actual values of the phase currents of the inverter;

a switching logic circuit for generating the switching signals; and a hysteresis current control device comprising a first hysteresis controller generating standard switching signals for direct hysteresis current control of the phase currents, and a second hysteresis controller generating an additional switching signal for a selected phase of the inverter as a function of a zero sequence current of the inverter, wherein the additional switching signal is set to a value +1 when the zero sequence current is greater than a positive interval limit of a first hysteresis window, wherein the additional switch signal is set to the value −1 when the zero sequence current is smaller than a negative interval limit of the first hysteresis window, and wherein the additional switching signal is set to the value zero when the zero sequence current exceeds or falls below the value zero; and wherein the switch g logic sets the switching signal for the selected phase to a value −1 when the additional switching signal assumes the value +1, wherein the switching logic sets the switching signal for the selected phase to the value +1 when the additional switching signal assumes the value −1, and wherein the switching logic otherwise sets the switching signal for the selected phase to the standard switching signal of the hysteresis control for the selected phase, and wherein the switching signal for the other two phases are set to the standard switching signal for each of the respective other two phases.

* * * * *